Feb. 23, 1971     K. J. LISSANT     3,565,817

CONTINUOUS PROCESS FOR THE PREPARATION OF EMULSIONS

Filed Aug. 15, 1968

Flow Curve for Emulsion A

Flow Curve for Emulsion B

Emulsion Parameter Relationships

INVENTOR
KENNETH J. LISSANT
BY
Sidney B. Ring
ATTORNEY

United States Patent Office 3,565,817
Patented Feb. 23, 1971

3,565,817
CONTINUOUS PROCESS FOR THE PREPARATION OF EMULSIONS
Kenneth J. Lissant, St. Louis, Mo., assignor to Petrolite Corporation, Wilmington, Del., a corporation of Delaware
Continuation-in-part of application Ser. No. 411,103, Nov. 13, 1964. This application Aug. 15, 1968, Ser. No. 753,340
Int. Cl. B01j *13/00*
U.S. Cl. 252—312                    1 Claim

ABSTRACT OF THE DISCLOSURE

A continuous process for the preparation of thixotropic high-internal-phase-ratio emulsions, having non-Newtonian flow properties, which is characterized by introducing into a preformed emulsion of approximately the same character as the desired emulsion both the internal and external phases of the emulsion in the presence of an emulsifier in such proportions so as to produce the desired emulsion while maintaining the emulsified mass in a state of continuous shear sufficient to reduce the effective viscosity of the emulsified mass near to that of the introduced phases but not above the inherent shear stability point of the desired emulsion, and withdrawing the prepared emulsion at the desired rate.

---

This application is a continuation-in-part of application SN 411,103 filed Nov. 13, 1964, entitled "Emulsion Preparation," now abandoned.

This invention relates to a continuous process for the preparation of thixotropic high-internal-phase-ratio emulsions, having non-Newtonian flow properties, which is characterized by introducing into a preformed emulsion of approximately the same character as the desired emulsion both the internal and external phases of the emulsion in the presence of the emulsifier in such proportions so as to produce the desired emulsion while maintaining the emulsified mass in a state of continuous shear sufficient to reduce the effective viscosity of the emulsified mass near to that of the introduced phases but not above the inherent shear stability point of the desired emulsion, and withdrawing the prepared emulsion at the desired rate.

Classically an emulsion is defined as a continuous liquid phase in which is dispersed a second, discontinuous liquid phase. It is also well known that when an immiscible liquid phase is introduced into a second liquid phase with agitation, the introduced phase disperses into discrete droplets. If two pure liquid phases are used, the droplets will begin to coalesce as soon as agitation is stopped and will separate into two discrete phases.

Modern terminology distinguishes between "dispersions" and "emulsions". Whenever two immiscible liquid phases are subjected to agitation, one will become dispersed in the other. However, in the absence of appropriate stabilizing agents the two phases will separate rapidly when agitation is stopped. Such temporary non-stable systems are called "dispersions"; and it is only when the system contains appropriate stabilizing agents so that the internal phase remains in discrete droplets without significant coalescence or creaming that the system is considered to be an emulsion.

However, if approximate surface active materials or emulsifiers are present in the system, coalescence will be prevented, and when agitation is stopped, a layer of droplets of the dispersed phase will form. This is known as "creaming." However, if the droplets of internal phase are made small enough so that thermal and Brownian forces overcome the settling effect of the gravity field then a "stable" emulsion results.

Practically all emulsions are made on a batch-wise basis. That is, an approximate amount of the external phase is placed in a mixing vessel and the internal phase is added, a little at a time, until the desired amount of internal phase has been introduced. Provision is made for sufficient agitation so that the necessary degree of sub-division is obtained. This often requires devices capable of producing high shear rates, such as high speed impellers, colloid mills, etc. Recently cavitation produced by ultrasonics has also been used as a means of producing high shear rates.

Emulsions containing 10% to 30% internal phase by volume have been made on a semi-continuous basis. In this case the internal phase is fed into the external phase and mixed to form a loose dispersion. The dispersion is then fed to a higher shear device and the droplet size reduced until stability is obtained. However, as the volume of internal phase approaches the volume of external phase, it becomes increasingly difficult to be sure that the dispersion will form with the proper external phase. When the volume of internal phase is greater than that of the external phase, it is only in very special cases and with great difficulty that a proper emulsion can be made by simple mixing.

For example, J. T. Davies and E. K. Rideal in their book entitled Interfacial Phenomena (1961) on pages 378 and 379 state that:

"In practical emulsifying machines, oil and water are forced between two shearing plates, the tendency of the mixture to form an emulsion of a certain type being measured by the phase volume, $\phi$, of oil at which the emulsion inverts from oil continuous to water continuous or vice versa. When $\phi$ is near unity, the emulsion will always be oil continuous, irrespective of the other factors; and when $\phi$ is small, the emulsion will always be water continuous."

Emulsions in which the volume of internal phase exceeds the volume of external phase, when required commercially, are made on a batch basis. The procedure is to place the external phase in a mixer, add the emulsifying agent, and then add the internal phase slowly with vigorous mixing. Sometimes the internal phase is added slowly but continuously. Usually it is added in increments and mixed well between additions. The process is however a batch process.

Until recently, no practical means were known for producing stable emulsions with internal-phase ratios much in excess of 74%. As early as approximately 1907 Pickering produced what he thought was an emulsion of kerosene in a concentrated soap solution containing in excess of 90% of internal phase. However, later studies have shown that this was not a true emulsion since a substantial amount of the hydrocarbon was solubilized in the soap micelles, producing a viscous grease, and the remainder of the kerosene was dispersed in the pasty mass. Illustrative of this development, . . . Glasstone, in his Textbook of Physical Chemistry, on page 1250 thereof of the 1940 edition, states that:

"The so-called emulsion prepared by S. U. Pickering (1907) containing 99 parts of kerosene oil dispersed in one part of soap solution is often quoted as evidence in favor of the deformability of liquid drops and as an argument against the phase-volume theory. It has now been shown (A. S. C. Lawrence, 1937) that the system is not an emulsion but a paste of oil and soap."

Recently, emulsifiers and emulsification systems have been developed which allow the practical preparation of high internal-phase-ratio emulsions containing more than 80% internal phase, such as more than 90% for example more than 95%, and in some cases more than 98% internal phase.

Emulsions of this type may be prepared by methods described in my co-pending applications and patents. However, commercial production of these emulsions to date has been limited to batch operations, since if extreme care is not taken in their preparation they are unstable.

Such emulsions are described in the following patent applications which are incorporated into this patent application as if part hereof. These patent applications include the following:

| U.S. Patent | Serial No. | Filing date | Title |
|---|---|---|---|
|  | 302,177 | Aug. 14, 1963 | Hybrid Fuels I (now abandoned). |
|  | 565,702 | July 18, 1966 | Thixotropic Oil-in-Water Emulsion Fuels. |
| 3,396,537 | 302,001 | Aug. 14, 1963 | Hybrid Fuels II. |
|  | 411,103 | Nov. 13, 1964 | Emulsion Preparation (now abandoned). |
| 3,378,418 | 541,738 | Apr. 11, 1966 | Treating Thixotropic Emulsions. |
|  | 286,877 | May 20, 1963 | Stable Emulsions (now abandoned). |
|  | 599,332 | Oct. 19, 1966 | Stable Emulsions (cont.-in-part of S.N. 286,877) (now abandoned). |
| 3,432,152 | 637,332 | May 10, 1967 | Essentially Non-Aqueous Emulsions. |
| 3,352,109 | 547,581 | May 4, 1966 | Hybrid Thixotropic Rocket and Jet Fuels Comprising Oil-in-Water Emulsions (continuation of 302, 177). |

High internal-phase ratio emulsions wherein the external phase is in excess of 80% by volume possess peculiar rheological properties. When subjected to sufficiently low rates of shear, they behave like elastic solids. As the rate of shear is increased a point is reached where they begin to flow. This is referred to as the "yield value". When such emulsions are subjected to increasingly high rates of shear, they exhibit non-Newtonian behavior; and the effective viscosity decreases rapidly until shear rates in the range of 3,000 to 8,000 reciprocal seconds are reached. In this range the effective viscosity plateaus at a figure close to the viscosity of the external phase. If increasingly high rates of shear are applied, a point is reached where the emulsifying agents can no longer maintain stable films, and at this point the emulsion breaks and cannot be reconstituted readily.

The yield value and shear stability point, as well as the shape of the viscosity-versus-shear curve, will vary with each particular emulsion formulation.

FIG. 1 is the actual flow curve of Emulsion A. It is to be noted that as the effective viscosity approaches zero the emulsion is broken.

FIG. 2 is the actual flow curve of Emulsion B. Here again, as the flow curve approaches zero the emulsion is broken.

FIG. 3 is an example of idealized flow curve which is employed to characterize any emulsion showing the initial drop in effective viscosity with shear until a plateau is reached.

Figure 1:
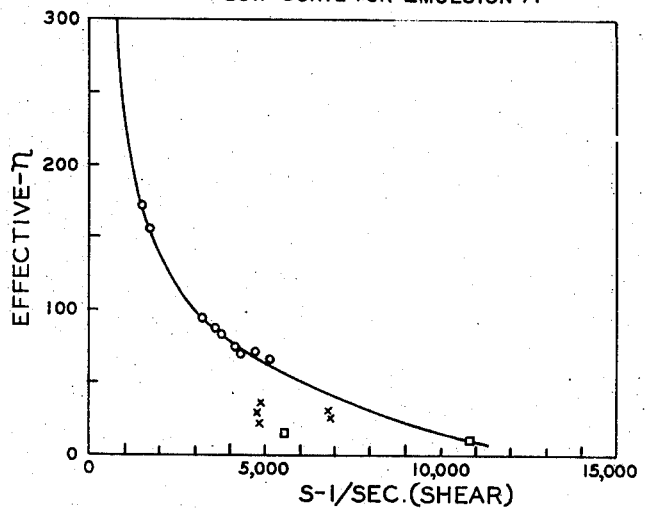
FIGS. 1, 2 and 3 illustrate the flow curve relationship of Effective Viscosity ($\eta$) to Shear in Reciprocal Seconds (S–1/sec.).

In practice, it is advantageous to employ an effective viscosity in this plateau region, i.e. where the curve tends to become more horizontal to the base of the curve.

These figures are obtained by the procedure presented herein.

Heretofore methods for the measurement of viscosity under controlled shear rate conditions require complex equipment and are particularly difficult to obtain in the shear rate ranges normally encountered in transfer and utilization equipment. A procedure for pumping HIPR emulsions through tubes of known geometry and of sizes comparable to those encountered in engine fuel lines is presented herein. By employing this procedure the correlation of shear and effective viscosity can be determined.

EQUIPMENT

The apparatus is basically quite simple. It consists of three tubes approximately five feet long of varying diameters through which the formulations are pumped. Each tube is 152.4 cm. long. The average radius of each tube was determined by direct micrometer measurement at each end of the tube, and it was found that tube No. 1 has an average radius of 0.535 cm.; tube No. 2 has an average radius of 0.396 cm.; and tube No. 3, 0.185 cm. Provisions are made for measuring the pressure drop across the tubes and the rate at which the fluid is being pumped. Currently, I am measuring the pressure drop by means of test gauges at either end of the tube, and I am measuring the flow rate by determining the time required to pump 10 kg. of fluid. Pressure drop values can be read to within 0.2 p.s.i. over the range 0–60 p.s.i. The times are measured with a stopwatch to within 0.1 sec, and the weight of material pumped is measured to within 1.0 g. A two-inch Viking pump, driven by a direct current motor and coupled to a motor controller, is used for pumping the fluid. Fluid is picked up from a 13-gallon container located so that the pump has less than one foot of head to overcome on the pickup side. The pickup lines are inch-and-a-half steel pipe. The exit lines from the pump are reduced to inch and a half at the pump exit, and to three-quarter-inch flexible hose prior to connection to the test section. Three-quarter-inch hose is attached to the exit end of the test section, and the fluid is conducted into a 5-gallon bucket placed on a trip balance with a capacity of 20 kg. ±1.0 g. The temperature of the fluid being pumped was recorded at the beginning and at the end of each run. No attempt was made in these initial tests to control the temperature.

PROCEDURE

Approximately 10 gal. of test fluid is placed in the supply tank; the flexible hose is connected to the appropriate test section; and fluid is pumped until all air is displaced from the system. The supply tank is then replenished and 10 kg. of material is pumped through the system. The time required to pump 10 kg. is measured with a stopwatch, and the average pressure differential is read from the test gauges. The temperature of the fluid in the supply tank and the receiver are recorded at the end of each run. It is hoped in the near future that a recording differential pressure unit and a recording flow meter can be installed to increase the accuracy of measurement and reduce the number of personnel required to conduct the tests.

EXAMPLES

The first series of tests consisted of a number of standardization runs using water as the standardizing fluid. Water was pumped through each of the tubes at several different flow rates and the pressure differential, temperature, and flow rates recorded. Another series of tests was then run using experimental HIPR fuel emulsions A and B.

CALCULATIONS

The calculation of viscosity from $\Delta P$ and $v/t$ data has been worked out in some detail for capillary rheometers [1,2].

Equation 1:

$$n = \frac{68944\pi R^4 P}{8Lv/\dagger}$$

where:

$n$ = Viscosity in poises
$R$ = Radius of tube in cm.
$L$ = Length of tube in cm.
$\Delta P$ = Pressure drop in lb/in$^2$
$v./\dagger$ = Pumping rate in cm.$^3$/sec.

Equation 1 shows the relationship usually employed in this work. It is based on the assumption that the tube is quite long with respect to its diameter, and that flow is completely laminar. While this equation is quite satisfactory for tubes of capillary diameters, the assumptions are usually not valid for larger tubes. The $\Delta P$ and $\dagger$ values obtained in our standardization runs are summarized in Table 1. When attempts were made to fit these data to Equation 1, constant values of viscosity were not obtained. It was therefore decided to employ a form of the viscosity equation which incorporates empirical corrections for errors due to kinetic energy effects and errors caused by turbulence at the ends of the test section. Equation 2 is the standard equation of this type.

(2) $$n = \frac{6894\pi R^4 \Delta P}{8(L+nR)v/\dagger} - \frac{mp(v/\dagger)}{8\pi(L+nR)}$$

where $p$ = density and $m$ and $n$ are empirical constants.

If we assume R and L to be constant for any particular tube, this equation reduces to an equation of the type $$n = \frac{K_1 \Delta P}{v/\dagger} - K_2 pv/\dagger$$

or $$n = \frac{K_1 \Delta P}{10,000/p \times \dagger} - K_2 p \times \frac{10,000}{p \times \dagger}$$

where $\dagger$ is the time in seconds to pump 10 kg. of fluid. Simplifying and combining constants, we obtain $$n = K_3 \times p \Delta P \times \dagger - K_4 \times 1/\dagger$$

where $$K_3 = \frac{K_1}{10,000} \text{ and } K_4 = 10,000 \, K_2$$

Rearranged, we obtain Equation 3:

(3) $$\frac{1}{\dagger} = \frac{K_3}{K_4} \times p(\Delta P \times \dagger) - \frac{n}{K_4}$$

Equation 3 indicates that if one plots $1/\dagger$ against $\Delta P \times \dagger$, one should obtain a straight line where:

$$\text{Slope} = \frac{K_3 \times p}{K_4}$$

and $$\text{Intercept} = \frac{-n}{K_4}$$

or $$K_4 = \frac{-n}{\text{intercept}}$$

$$K_3 = \frac{-n}{\text{intercept}} \times \frac{\text{Slope}}{p}$$

Plots of $1/\dagger$ versus $\Delta P \times \dagger$ were made for each of the three tubes using the data obtained in the water-pumping tests. It was found that these plots were reasonably linear. Slopes and intercepts were then determined, using the method of least squares, and $K_3$ and $K_4$ calculated.

The "effective" viscosity of the emulsions was then calculated using the equation:

$$n_{\text{eff}} = K_3 p \Delta p.\dagger - K_4 .1/\dagger$$

where $p$ = Density of the emulsion
$p$ = Pressure drop across the test section
$\dagger$ = Time in seconds to pump 10 kg.

and $K_3$ and $K_4$ are the arbitrary constants determined above.

Three tubes were used, each with a length of 152.4 cm. and with radii of 0.535 cm., 0.396 cm., and 0.185 cm. respectively.

For tube No. 1, $K_3 = 0.1349$ and $K_4 = 415$
For tube No. 2, $K_3 = 0.02775$ and $K_4 = 343$
For tube No. 3, $K_3 = 0.00175$ and $K_4 = 737.5$ For convenience, the K's have been calculated so as to yield viscosity in centipoises rather than in poises. The density of the emulsion was taken as 0.75 g./cm.$^3$.

Table I contains the standardization data obtained by pumping water; Table II, the data for Emulsion A, and Table III, the data for Emulsion B. Shear rate was calculated according to the procedure outlined in ASTM D 1092–62 where:

$$S = \frac{4v/\dagger}{\pi R^3}$$

Since most pressure devices are graduated in lb./in.$^2$, this unit was retained for P rather than conversion to c.g.s units.

INTERPRETATION OF DATA

FIG. 1 shows a plot of the effective viscosity versus shear rate for Emulsion A. It will be noted that a reasonably smooth curve can be drawn through the majority of the points. It is also encouraging to note that where the ranges of the tubes overlap the effective viscosities obtained are in agreement. The first few determinations which were obtained using tube No. 2 fall below the general line. This is believed to be due to the fact that this emulsion had aged somewhat, and the first few pumping tests resulted in "winding up" the emulsion and producing a higher viscosity. For this reason, the values gradually rise until they come within the range of the general curve. At shear rates of approximately 10,000 reciprocal seconds the emulsion began to show irreversible breaking. This would mean that equipment used in transferring such an emulsion would have to be designed to avoid shear rates in excess of 10,000 reciprocal seconds.

Figure 2:
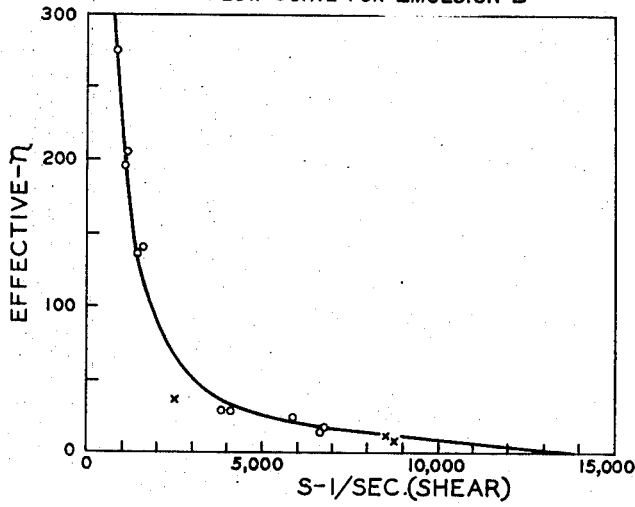

FIG. 2 shows comparable data obtained for Emulsion B. Here the agreement is, if anything, better than the previous set. The overlap areas are in good agreement, and it should be noted that this emulsion does not begin to break until shear rates approach 13,000 reciprocal seconds.

These curves are particularly remarkable when one considers that if viscosities are determined with a Brookfield Viscometer at shear rates in the neighborhood of 100 reciprocal seconds, values are obtained which range from 10,000 cp. to 100,000 cp. On the basis of the Brookfield data one would not expect these emulsions to show effective viscosities well below 500 cp. in the normal pumping range. In other words, although these formulations behave like elastic solids or extremely viscous liquids when at rest or subjected to low shear conditions, they can be pumped much more readily than one would be led to predict. Even if the absolute values are in error by an order of magnitude, the pumping properties would still be entirely within the practical range.

Another interesting point concerning the two graphs is that while Emulsion B has a yield value in the neighborhood of 800 dy./cm$^2$ and Emulsion A has a yield value of approximately 1800 dy./cm$^2$, their effective viscosities in the pumping range are not very different. This means that it may not be necessary to sacrifice ease of pumping in order to achieve high yield value.

TABLE I
[Pumping data for H$_2$O]

| Tube used | ΔP | t | ΔP×t | 1/t | T° F. |
|---|---|---|---|---|---|
| Number 1 | 3.0 | 33.1 | 99.3 | 0.0302 | 65.0 |
|  | 3.3 | 31.5 | 103.95 | 0.0317 | 65.5 |
|  | 4.0 | 28.6 | 114.4 | 0.0350 | 66.0 |
|  | 4.5 | 26.9 | 121.05 | 0.0372 | 66.5 |
|  | 5.6 | 24.0 | 134.4 | 0.0417 | 67.0 |
|  | 7.2 | 21.1 | 151.9 | 0.0474 | 64.5 |
|  | 11.4 | 16.8 | 191.5 | 0.0595 | 65.5 |
|  | 13.1 | 15.6 | 204.36 | 0.0641 | 66.0 |
|  | 17.9 | 13.3 | 238.07 | 0.0752 | 66.0 |
|  | 20.1 | 12.5 | 251.25 | 0.0800 | 66.5 |
| Number 2 | 1.7 | 94.0 | 159.8 | 0.0106 | 64.5 |
|  | 1.7 | 93.3 | 158.6 | 0.0107 | 64.5 |
|  | 7.6 | 43.1 | 327.56 | 0.0232 | 64.5 |
|  | 7.6 | 42.7 | 324.52 | 0.0234 | 64.5 |
|  | 21.5 | 24.8 | 533.2 | 0.0403 | 64.5 |
|  | 21.5 | 24.7 | 531.05 | 0.0404 | 64.5 |
|  | 42.6 | 17.4 | 741.2 | 0.0575 | 65.3 |
|  | 42.5 | 17.4 | 739.5 | 0.0575 | 65.3 |
| Number 3 | 5.6 | 322.1 | 1,803.8 | 0.00310 | 68.0 |
|  | 17.5 | 174.3 | 3,050.3 | 0.00574 | 68.9 |
|  | 17.8 | 172.3 | 3,066.9 | 0.00580 | 68.9 |
|  | 32.6 | 123.4 | 4,022.8 | 0.00810 | 68.9 |
|  | 32.8 | 122.4 | 4,014.7 | 0.00817 | 68.9 |
|  | 43.9 | 104.5 | 4,587.6 | 0.00957 | 69.8 |
|  | 44.0 | 104.5 | 4,598.0 | 0.00957 | 69.8 |
|  | 50.2 | 96.8 | 4,859.4 | 0.01030 | 71.6 |

TABLE II
[Pumping data for Emulsion A]

| Tube used | ΔP | t | T° C. | n | S |
|---|---|---|---|---|---|
| Number 1 | 30.0 | 34.9 | 24.0 | 94.0 | 3,176.6 |
|  | 31.8 | 30.5 | 24.0 | 84.5 | 3,634.7 |
|  | 31.7 | 30.0 | 25.0 | 82.4 | 3,695.4 |
|  | 34.0 | 26.4 | 25.0 | 75.1 | 4,199.4 |
|  | 33.5 | 27.2 | 25.0 | 76.9 | 4,075.9 |
|  | 39.0 | 23.4 | 25.0 | 74.6 | 4,737.7 |
|  | 40.1 | 21.5 | 25.5 | 67.9 | 5,156.4 |
|  | 23.0 | 77.4 | 25.5 | 174.7 | 1,432.3 |
|  | 22.0 | 71.9 | 26.0 | 154.3 | 1,541.9 |
| Number 2 | 30.0 | 57.7 | 26.0 | 30.1 | 4,737.9 |
|  | 30.0 | 56.8 | 26.0 | 29.4 | 4,813.0 |
|  | 40.2 | 55.0 | 26.5 | 39.8 | 4,970.5 |
|  | 39.7 | 55.5 | 27.0 | 39.7 | 4,925.7 |
|  | 47.0 | 40.4 | 27.0 | 31.0 | 6,766.8 |
|  | 45.9 | 40.2 | 27.0 | 29.9 | 6,800.4 |
| Number 3 | 47.2 | 243.6 | 28.0 | 12.1 | 10,988.86 |
|  | 32.0 | 482.3 | 28.0 | 18.7 | 5,550.25 |

NOTE.—P is expressed in lb./in.$^2$; t=Time in seconds to pump 10 kg.; n=Viscosity in centipoise.

$$S = \frac{4v/t}{\pi R^3}$$

This data is presented in FIG. 1.

TABLE III
[Pumping data for Emulsion B]

| Tube used | ΔP | t | Pump setting | T° C. | n | S |
|---|---|---|---|---|---|---|
| Number 1 | 20.0 | 72.3 | 30 | 27.0 | 140.6 | 1,533.4 |
|  | 22.0 | 66.7 | 30 | 27.0 | 142.2 | 1,662.1 |
|  | 22.0 | 94.3 | 30 | 27.0 | 205.5 | 1,175.6 |
|  | 22.0 | 126.4 | 30 | 27.5 | 278.1 | 877.1 |
| (New Emulsion Sample) | | | | | | |
| Number 1 | 19.0 | 105.4 | 30 | 27.5 | 198.7 | 1,051.8 |
|  | 17.0 | 28.3 | 60 | 27.5 | 34.0 | 3,917.4 |
|  | 17.9 | 27.2 | 60 | 27.5 | 34.0 | 4,075.9 |
| Number 1 | 25.8 | 19.0 | 80 | 27.5 | 27.8 | 5,834.9 |
|  | 25.0 | 18.6 | 80 | 27.0 | 24.7 | 5,960.4 |
|  | 25.4 | 16.6 | 100 | 27.5 | 17.7 | 6,678.5 |
|  | 26.0 | 16.5 | 100 | 27.5 | 18.3 | 6,719.0 |
| Number 2 | 21.0 | 107.8 | 30 | 28.0 | 43.9 | 2,536.0 |
|  | 30.0 | 32.0 | 60 | 28.0 | 9.3 | 8,543.1 |
|  | 30.0 | 31.0 | 60 | 28.0 | 8.3 | 8,818.7 |
|  | 35.8 | 20.4 | 80 | 28.5 | (¹) | 13,400.9 |
|  | 35.9 | 20.4 | 80 | 28.5 | (¹) | 13,400.9 |

¹ Broken.

This data is presented in FIG. 2.

It has been suggested that high internal phase ratio emulsions can be made continuously by mixing some of the internal phase with an excess of the external phase and then transferring this pre-mix to another chamber where more internal phase is added. This partial mix is then transferred to another chamber where more internal phase is added. Enough stages are provided to obtain the desired ratio. In actual practice this method is difficult to accomplish. It requires separate mixers, pumps, and proportioning equipment at each stage and the stages have to be interlocked to assure uniformity of product.

I have now discovered that high internal phase ratio emulsions can be continuously made by (1) preparing a preformed emulsion of approximately the same character as the desired emulsion, (2) introducing into the preformed emulsion, both the internal and external phases of the emulsion in such proportions so as to produce the desired emulsion, while maintaining the emulsified mass in a state of continuous shear sufficient to reduce the effective viscosity of the mass near to that of the introduced phase but not above the inherent shear stability point of the desired emulsion, and (3) withdrawing the prepared emulsion at the desired rate.

If an attempt is made to mix two liquids of highly disparate viscosity, one finds that the mixing process is difficult and inefficient. If a small amount of low-viscosity liquid is added to a mass of high-viscosity liquid, it is difficult to incorporate homogeneously; and as more of the low-viscosity liquid is added, the highly viscous phase tends to break up and form a coarse dispersion in the thinner liquid. It is this fact which makes the batch preparation of high internal phase ratio emulsions difficult and which has prevented successful development of continuous emulsification processes for materials of this type. In the usual batch procedure an appropriate amount of external phase is placed in a mixing vessel and the internal phase is added slowly with thorough mixing. By the time the internal-phase ratio has reached 70 to 80 volume percent, the emulsified mass has become so viscous that further incorporation of the low-viscosity internal phase is difficult and inefficient. Unless very efficient mixing devices are employed, further additions of internal phase result in inversion and failure of the emulsification process. In the process of this inversion I have found that by subjecting the pre-emulsified mass in the mixer to shear rates within the plateau region of the curve shown in the figures, the effective viscosity of the formulation is reduced to near that of the incoming internal phases and, therefore, the mixing process becomes much more efficient and can be accomplished in a sufficiently short period of time to allow continuous operation. Care must be taken in the design of the means of applying shear so that substantially all of the pre-emulsified mass in the mixing equipment is subjected to shear rates high enough to produce a low effective viscosity, but not so high as to exceed the inherent shear stability point of the particular formulation. Most so-called continuous emulsification devices which have been employed for the production of low- and medium-internal-phase-ratio emulsions are not suitable for producing high-internal-phase-ratio emulsions, since they either produce shear rates too low to accomplish the required viscosity lowering or shear rates in excess of the inherent shear stability point. Thus, colloid mills and other high-shear devices cannot be used. Also, low-shear mixing devices, such as Hobart mixers or other equipment utilizing slow moving paddle-type stirrers, while they can be used for batch-type operations, do not reduce the effective viscosity to a point where continuous operation is practical. In the process as described in this invention, obviously the exact details of mixer configuration or other means of reducing the required shear rates can vary considerably, and therefore the exact means employed is only critical to the extent that it produces shear rates throughout the entire mass within the plateau range of the particular formulation.

In the practice of my invention I have found that high internal phase ratio emulsions can be made continuously in simple, compact equipment.

An example of an apparatus which can be used in the practice of my invention consists of a mixing chamber equipped with mixing blades of such a configuration that the highly thixotropic emulsion is subjected to a shear rate high enough to reduce the effective viscosity to near the external phase viscosity but not above the internal shear stability point, inlet ports for the internal and external phase and an exit port for the finished emulsion. In operation the equipment is first filled with an emulsion approximating that of the desired composition and then the emulsion is subjected to shearing forces in the appropriate range. Simultaneous injection of the internal and external phases is then begun. As the mixer incorporates the new material into emulsion in the chamber, finished emulsion is displaced from the exit port. The process may be envisioned as though a small batch of emulsion had been made containing X amount of external phase and Y amount of internal phase, the ratio Y/X being R. Now if a small amount, $p$, of external phase is added and the batch well mixed, a new emulsion with a slightly different ratio will result. Now if an amount of internal phase equal to $pR$ is added and mixed in one will have an emulsion of the same ratio as at the beginning but larger volume by an amount $p$ plus $Rp$. If this amount of finished emulsion is now removed, one is back to the initial state in the mixing vessel.

Although I do not wish to be bound by the theoretical considerations, my invention is based on the fact that I have found that $p$ and $Rp$ and the mixing time can be made very small. They can in essence approach a differential increment so that the process can be repeated successively and become continuous.

The following examples are presented for purposes of illustration and not of limintation.

Example 1

The apparatus employed consists of a piece of glass pipe, 6" in diameter and 12" long. The ends of the pipe are closed by metallic plates held on by standard clamps and bolts and sealed with a gasket. In the plate forming the bottom end two holes are drilled, tapped and fitted with piping for the introduction of the internal and external phase. The top plate is drilled and fitted with a gland to admit a stirrer assembly and an exit port for the finished emulsion.

The mixing assembly is driven by a motor turning at about 600 r.p.m. The mixing chamber holds about 5000 ml. of fluid. It is desired to make an emulsion with water as the external phase and kerosene as the internal phase. The phase ratio $Y/X$ being 19/1. That is 95 parts of kerosene (Y) is emulsified in five parts of water (X) containing emulsifier.

The external aqueous phase is made by dissolving 300 ml. of the emulsifier (n-decanol+PrO (1.96)+EtO (2.61), parts by weight), in 1000 ml. of water. Two hundred ml. of this material is introduced into the mixing chamber. The mixer is started and 3800 ml. of kerosene, the internal phase, slowly pumped into the chamber with thorough mixing. The result is a smooth, white, highly thixotropic, o/w, emulsion. This is essentially a batch process. Now, with the mixing assembly turned on, feed pumps for both kerosene and water are started and set to feed five parts of aqueous phase to 95 parts of kerosene. It is found that the chamber stayed full of smooth homogeneous emulsion and that emulsion is expelled from the exit line in a steady stream. A total of 38,000 ml. is put through the apparatus. Throughput is varied between 100 ml./min. and 900 ml./min. The output is sampled throughout the run and found to follow the input ratio in composition closely. At no time is the output found to be non-homogeneous. In these particular emulsions it was found, however, that the stirring motor must be operated within the range of 400 r.p.m. to 600 r.p.m. Too little or too much agitation results in broken emulsion. This gave viscosities in the plateau regions of the curves of the type shown in the attached figures.

Example 2

This example illustrates that simultaneous addition of both phases from the very beginning does not form a stable emulsion. The same apparatus and components are employed as in Example 1. With the mixing chamber empty and the stirrer on, simultaneous pumping of both phases at the rate of 5 to 95 parts water to kerosene is begun. It is found that a loose dispersion of the aqueous phase in kerosene results which separates on standing. This dispersion is allowed to separate and then emulsified batchwise. When this preformed batch emulsion is present in the mixing chamber and pumping of both phases at the rate of 5 to 95 parts water to kerosene is resumed, a smooth emulsion results and the continuous production of an o/w emulsion is effected.

Example 3

The procedure and apparatus of Example 1 is used except that the external phase is kerosene (5 parts) with a different emulsifier, namely octylphenol+EtO (.69) by weight, and the internal phase is tap water (95 parts). Again production of emulsion is easily effected where the mixing chamber is initially filled with a w/o emulsion of the desired phase ratio.

It is possible to vary the phase ratios and properties of the produced emulsion over wide limits simply by adjusting the emulsion in the chamber to the desired ratio and adjusting the feed rates to correspond to this ratio and adjusting the mixing intensity to the optimum range. Internal to external phase volume ratios of 50% or greater, such as 70 to 95%, advantageously 80 to 90%. The particular ratio will be determined by the desired application.

Employing the techniques of this invention, particularly that described in Example 1, the emulsions shown in the following tables are continuously prepared. The column describing serial number and example refers to the example described in the serial number of the application specified. In each case the emulsion was prepared as stated in each example to yield the preformed emulsion and then the phases, including the filler where indicated, and emulsifiers are continuously added in the indicated ratios. For example, in Table I, Example 1, the preformed emulsion is prepared according to Example 74 of Ser. No. 286,877 and to this preformed emulsion, with appropriate stirring, a ratio of internal and external phase, including emulsifier, is added in approximately the same ratio as that found in the preformed emulsion. The ratio of external and internal phases is indicated in the table.

TABLE I

| Serial number and example | External phase | Internal phase | Volume ratio external-internal phase | Emulsifier, Example |
|---|---|---|---|---|
| This Example: | | | | |
| 1 ................ 286,877, 74 ............ | Water .... | Isooctane ......... | 1/80(.99) | 1 |
| 2 ................ 286,877, 75 ............ | do ........ | Kerosene .......... | 0.75/10(.93) | 66 |
| 3 ................ 286,877, 76 ............ | do ........ | Mineral spirits .... | 1/50(.98) | 67 |
| 4 ................ 286,877, Table VI ...... | do ........ | Kerosene .......... | 1/50(.98) | 18 |
| 5 ................ 286,877, Table VII ..... | do ........ | do ................ | 1/65(.98) | 6 |
| 6 ................ 286,877, Table VIII .... | do ........ | do ................ | 1/42(.98) | 38 |
| 7 ................ 286,877, Table IX ...... | do ........ | do ................ | 1/49.5(.98) | 24 |
| 8 ................ 286,877, Table X ....... | do ........ | do ................ | 1/48(.98) | 65 |

NOTE.—SN 286,877:
Emulsifier Ex. 1, n-decanol plus PrO (.96) plus EtO (2.61)
Emulsifier Ex. 66, 1,3-butanediol plus BuO (3.0) plus PrO (32.2) plus EtO (16.6)
Emulsifier Ex. 67, triethylene glycol plus BuO (5.1) plus PrO (30) plus EtO (22)
Emulsifier Ex. 18, crude phenol foots plus EtO (1.75)
Emulsifier Ex. 6, n-decanol plus PrO (3.67) ° EtO (2.78)
Emulsifier Ex. 38, phenol-aldehyde resin plus PrO (1,012 M) plus EtO (150.8 M) moles/unit phenolic resin
Emulsifier Ex. 24, glycerine plus BuO (2.52) plus PrO (34.1) plus EtO (21.0)
Emulsifier Ex. 65, epichlorohydrin amine products plus PrO (2.23) plus EtO (2.93) plus PrO (25.5) plus EtO (40).

All of the above ratios are parts by weight except where indicated. In relation to the phenolic resin the moles of alkylene oxide per unit of phenolic resin are specified i.e. the emulsifier of Ex. 38.

be from .05–5 volume percent, but preferably 0.2–3%, larger amounts can also be employed if desired. However, the economics generally restricts the amount employed to the ranges indicated.

TABLE II

| Serial number and example | External phase | Internal phase | Volume ratio external to internal phases | Emulsifier | Filler |
|---|---|---|---|---|---|
| This Example: | | | | | |
| 1 .......... | 302,177, 78 | Water ..... | Kerosene .... | 1/30(0.97) | Ex. 1 ............... Al(80 g.). |
| | | | | | Ex. 20 ............... |
| 2 .......... | 302,177, 79 | do ........... | do ......... | 1/30(0.97) | Ex. 18 .............. Carbon black (60g.). |
| 3 .......... | 302,177, 80 | ...do ........ | do ......... | 1/30(0.97) | Table 1 Ex. 6 ...... Al(90g.). |
| 4 .......... | 302,177, 81 | ...do ........ | do ......... | 1/30(0.97) | Table IV Ex. 40 ... Al(80g.). |
| 5 .......... | 302,177, 82 | ...do ........ | do ......... | 1/30(0.97) | Table IV Ex. 46 ... Al(80g.). |

NOTE.—SN 302,177:
Emulsifier Ex. 1, n-decanol plus PrO (1.96) plus EtO (2.61)
Emulsifier Ex. 20, n-decanol plus PrO (3.67)
Emulsifier Ex. 18, crude phenol foots plus EtO (1.75)
Emulsifier Table I Ex. 6, n-decanol plus PrO (3.67 plus EtO) (2.78)
Emulsifier Table IV Ex. 40, phenolic-aldehyde resin plus PrO (1012 M) plus EtO (893.7 M) moles/phenolic unit
Emulsifier Table IV Ex. 46, phenolic-aldehyde resin plus PrO (848 M) plus EtO (487.5 M) moles/phenolic unit.

All of the above emulsifiers are parts by weight except where stated in relation to the phenolic resin where it is moles of alkylene oxide per unit of phenolic resin.

The emulsion can be a non-oily/oily emulsion, such as water-in-oil or an oily-non-oily emulsion such as oil-in-water. Other non-oily phases besides water can be em-

TABLE III

| Serial number and example | External phase | Internal phase | Volume ratio external to internal phases | Emulsifier, Example | Filler |
|---|---|---|---|---|---|
| This Example: | | | | | |
| 1 ................... 302,001, 87 ........................ | Kerosene .... | Hydrazine .... | 1/25 (0.96) | 1 | .............. |
| 2 ................... 302,001, Table I Test 3 ............ | do ............ | do ........... | 1/20 (0.96) | 84 | Al(90 g.) |

NOTE.—SN 302,001:
Emulsifier Ex., 1, n-decanol plus PrO (1.96) plus EtO (2.61)
Emulsifier Ex. 84, hexadecanol plus PrO (1.2) plus EtO (1.5) which is exterified with maleic anhydride.

All of the parts specified above are parts by weight.

Non-aqueous emulsions which can be continuously prepared are those disclosed in Belgian Pat. 704,937.

Figure 3:
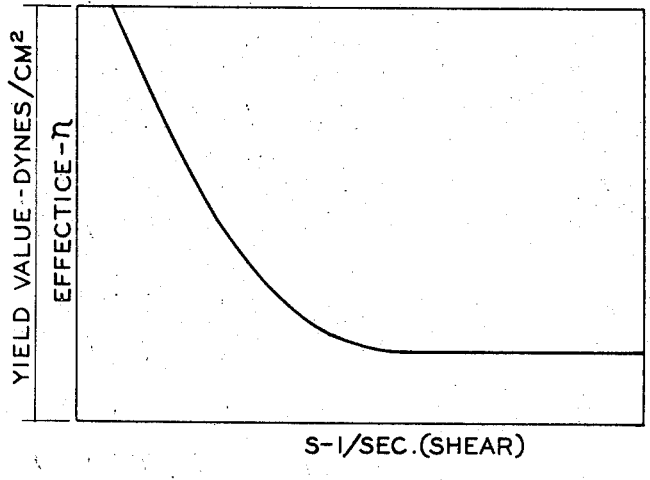

In all of the above examples stirring is effected to yield viscosities on the plateau region of the curves of the type shown in FIGS. 1, 2 and 3, but below the point at which the emulsion breaks.

The components of the oily and non-oily phases can be any of those specially designed in applications S.N. 286,877, S.N. 302,001 and S.N. 302,177 and the volume ratios inter se can be those specially designated in this application as well as in S.N. 286,877, 302,001, and 302,177, for example, internal phases (either oily or non-oily) of from 50–99%.

Any suitable emulsifier can be employed including these specifically mentioned in S.N. 286,877, 302,001 and 302,177. Oxyalkylated emulsifiers are preferred but any suitable amount of emulsifier capable of preparing these emulsions can be employed, for example, in those amounts described in S.N. 286,877, 302,001 and 302,177. Although the amount of emulsifier present in the total emulsion can ployed such as hydrazine, glycols such as ethylene glycol, diethylene glycol, propylene glycol, dipropylene glycol, etc. The preferred oily phase is a petroleum derived oily phase.

The emulsions produced by this process may be employed for the uses specified in S.N. 286,877, 302,001 and 302,177.

This new, novel, and useful process is a great improvement over current methods. Besides making it possible to produce emulsions on a continuous basis, it has the added advantage that the power requirements are much lower than for batch mixing. For example a 1½ gallon mixing chamber unit using a fractional horsepower motor was found to have an output of at least one quart per minute. This unit could produce over 100 gallons of emulsion in an eight hour shift. The output can be coupled to a filling machine and only as much emulsion as required for a run can be made. The unit can be stopped and restarted as described. A one hundred gallon mixer to make the same emulsion on a batch basis would be much larger and would require a multi-horsepower stirrer and, furthermore, once a batch of emulsion is made it must all be used or wasted. If desired, solids may be incorporated into either phase.

Having thus described my invention, what I claim as new and desire to obtain by Letters Patent is:

1. A continuous process for the preparation of a thixotropic high-internal-phase-ratio emulsion having a high volume ratio of internal phase to external phase, the emulsion having an emulsifying agent, an emulsifiable oil and non-oil and being an oil-in-non-oil or a non-oil-in-oil emulsion, the internal phase of said emulsion being present in said emulsion in an amount of at least 80% by volume of the emulsion, said emulsion having non-Newtonian flow properties, consisting essentially of mixing with (A) a preformed thixotropic emulsion having non-Newtonian flow properties and a high volume ratio of internal phase to external phase, and consisting essentially of an emulsifying agent, an emulsifiable oil and non-oil and being an oil-in-non-oil or a non-oil-in-oil emulsion, the internal phase of said preformed emulsion being present in an amount of at least 80% by volume thereof, simultaneously and continuously (B) both the internal phase material and the external phase material of (A) in the presence of an emulsifying agent, said internal phase material being continuously introduced in an amount of at least 80% by volume of the internal phase material, external phase material and emulsifying agent being introduced so as to continuously produce said thixotropic high-internal-phase ratio emulsion (A) having an internal phase in an amount of at least 80% by volume thereof while simultaneously maintaining said preformed thixotropic emulsified mass in a state of continuous shear sufficient to reduce the effective viscosity of said preformed thixotropic emulsified mass near to that of said continuously introduced phases but not above the inherent shear stability point of said thixotropic high-internal-phase-ratio emulsion being formed and having an internal phase in an amount of at least 80% by volume thereof and non-Newtonian flow properties, and withdrawing said so continuously prepared emulsion at the desired rate, said non-oil being a member selected from the group consisting of water, hydrazine, ethylene glycol, diethylene glycol, propylene glycol and dipropylene glycol.

References Cited
UNITED STATES PATENTS 1,374,755  3/1921  Murphy _____ 252—312
1,525,409  2/1925  Nevev _____ 252—312

JOHN D. WELSH, Primary Examiner

U.S. Cl. X.R.

252—310, 311